(12) United States Patent
Yasuda

(10) Patent No.: US 7,154,199 B2
(45) Date of Patent: Dec. 26, 2006

(54) DRIVING APPARATUS FOR MOVING MEMBER TO BE MOVED

(75) Inventor: Hiromu Yasuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/295,702

(22) Filed: Dec. 7, 2005

(65) Prior Publication Data

US 2006/0138873 A1   Jun. 29, 2006

(30) Foreign Application Priority Data

Dec. 24, 2004   (JP)   ............................. 2004-373255

(51) Int. Cl.
*H02K 41/00*   (2006.01)

(52) U.S. Cl. ...................... 310/12; 396/133; 310/49 R

(58) Field of Classification Search ............... 310/49 R
See application file for complete search history.

(56) References Cited

U.S. PATENT DOCUMENTS

| | | | |
|---|---|---|---|
| 5,418,588 A * | 5/1995 | Chigira | 396/463 |
| 6,017,155 A * | 1/2000 | Depatie et al. | 396/463 |
| 6,560,411 B1* | 5/2003 | Wakabayashi et al. | 396/85 |
| 6,798,093 B1 | 9/2004 | Aoshima | 310/49 R |
| 6,800,970 B1 | 10/2004 | Aoshima | 310/49 R |
| 6,809,884 B1* | 10/2004 | Nomura et al. | 359/699 |
| 6,850,701 B1* | 2/2005 | Nomura et al. | 396/79 |
| 7,039,309 B1* | 5/2006 | Hsiao | 396/85 |
| 2002/0047313 A1 | 4/2002 | Aoshima | 310/10 |
| 2004/0164623 A1* | 8/2004 | Suzuki et al. | 310/12 |
| 2004/0164624 A1* | 8/2004 | Suzuki et al. | 310/12 |

FOREIGN PATENT DOCUMENTS

| | | |
|---|---|---|
| JP | 2002-051524 A | 2/2002 |
| JP | 2004-048873 A | 2/2004 |

* cited by examiner

*Primary Examiner*—Darren Schuberg
*Assistant Examiner*—Ondria Garner
(74) *Attorney, Agent, or Firm*—Fitzpatrick, Cella, Harper & Scinto

(57) ABSTRACT

A magnet of a driving apparatus for moving a member to be moved from one abut end position to the other abut end position is caused to generate a magnetic force acting in the direction of an optical axis as well as a torque acting in a rotational direction.

1 Claim, 8 Drawing Sheets

FIG. 8A
FIG. 8B
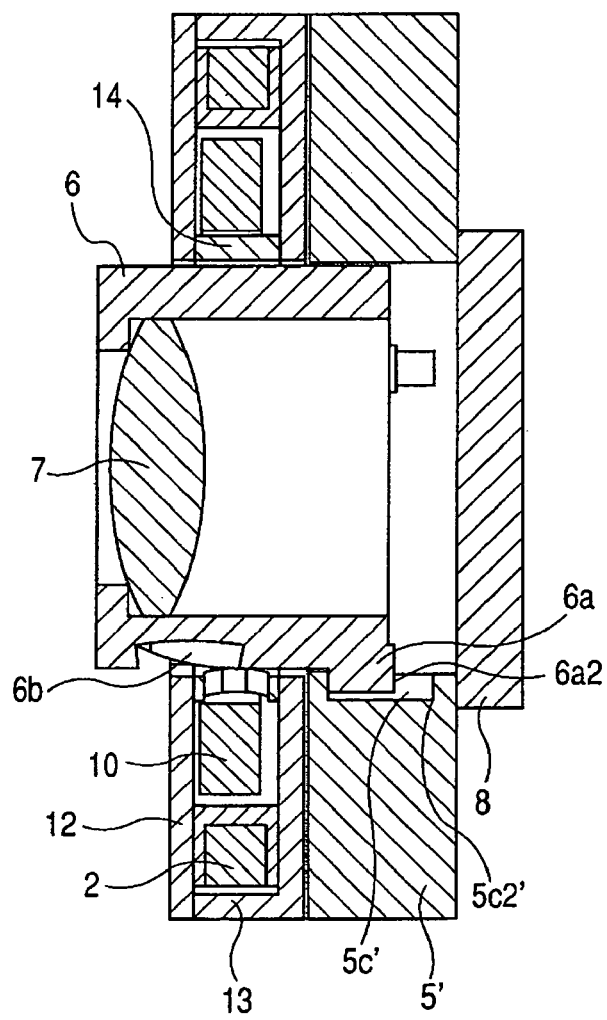
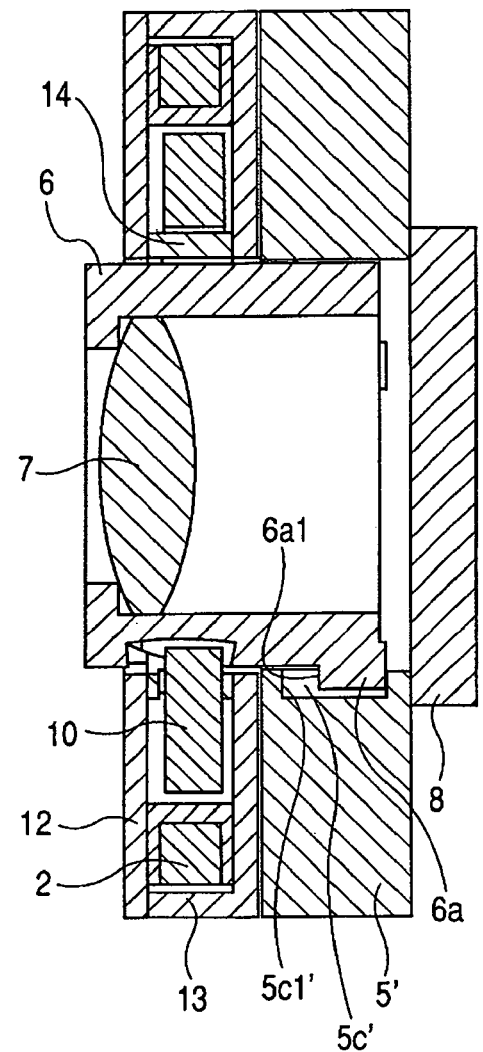

DRIVING APPARATUS FOR MOVING MEMBER TO BE MOVED

BACKGROUND OF THE INVENTION

1. Field of the Invention

The present invention relates to a driving technology suited for an image pickup apparatus and the like.

2. Related Background Art

The technical concept of a driving apparatus having the following construction is disclosed in Japanese Patent Application Laid-Open No. 2002-051524. This driving apparatus includes: a magnet formed in a cylindrical shape, its outer peripheral surface being circumferentially divided into a plurality of sections that are alternately magnetized in different polarities; a first bobbin wound by a coil; a second bobbin wound by another coil; a first outer magnetic pole portion excited by the coil wound around the first bobbin and opposed to the outer peripheral surface of the magnet on one end side thereof; a first inner magnetic pole portion having a substantially cylindrical and hollow shape and opposed to an inner peripheral surface of the magnet; and a second outer magnetic pole portion excited by the coil wound around the second bobbin and being opposed to the outer peripheral surface of the magnet on the other end side thereof. The second inner magnetic pole portion has a substantially cylindrical and hollow shape and is opposed to the inner peripheral surface of the magnet. The apparatus also includes a moving unit coupled to the magnet and optical means which has its optical axis in a hollow portion of the first inner magnetic pole portion or in a hollow portion of the second magnetic pole portion and rotates to thereby move the optical means in an optical axis direction.

A positive effect is obtained according to the technical concept of the above-mentioned construction. For example, the driving apparatus has a compact structure in which the coils and the magnet do not occupy a large area on a bottom board. One of the factors behind that effect is that the coils and the magnet are disposed axially.

However, the foregoing construction leads to an increase in the length of the driving apparatus in the optical axis direction and complication of a drive circuit thereof. According to some product specifications, a lens may be driven between two different positions. For instance, the lens may move between a storage position and a service position, or the lens may move between a normal shooting distance position and a macro shooting position. For such cases, a mechanism for moving a lens simply between two different positions has been desired.

To fulfill this desire, the technical concept of a driving apparatus having the following construction is disclosed in Japanese Patent Application Laid-Open No. 2004-048873. This driving apparatus includes: a lens; let-out means; a magnet that is rotatable and whose outer peripheral surface has a cylindrical magnetizing portion that is circumferentially divided so that its divided portions are alternately magnetized in different polarities; a coil disposed in an axial direction of the magnet; a stator having at least one tooth-shaped outer magnetic pole portion and a substantially cylindrical and hollow inner magnetic pole portion, which are respectively opposed to the outer peripheral surface and an inner peripheral surface of the magnetizing portion of the magnet, the stator being excited by the coil; and a lens having its light path in a hollow and cylindrical portion of the inner magnetic pole portion of the stator. The let-out means lets the lens out along an optical axis as the magnet rotates. The tooth-shaped outer magnetic pole portion is opposed to the outer peripheral surface of the magnetizing portion of the magnet opposed thereto within a predetermined angular range, so that the condition $-0.3X+0.63>Y$ is satisfied, where Y represents a ratio of an angle of one magnetized pole of the magnetizing portion of the magnet to the predetermined angle at which the outer magnetic pole portion is opposed to the magnetizing portion of the magnet, and X represents a ratio of a circumferential length of one magnetized pole of the magnetizing portion of the magnet to a radial thickness of the magnet.

Owing to the technical concept of the aforementioned configuration, the central position of the magnetized pole of the magnet is stably held at a position opposed to the center of the tooth of the outer magnetic pole portion when the coil is not energized. The magnet is driven such that the central position of the magnetized pole of the magnet moves among positions opposed to the centers of teeth of the outer magnetic pole portion when the coil is energized. The magnetizing portion of the magnet driven through energization of the coil receives an attraction force acting in a rotational direction due to a magnetic force that is generated in the stator such that the magnetizing portion stays where it is, when the coil is stopped from being energized.

In other words, the lens can be held in its let-out state or its let-in state even during cessation of energization after the lens has been driven once through energization. As a result, a driving apparatus with a simple drive circuit construction and low power consumption can be realized.

However, according to the technical concept disclosed in the above-mentioned Japanese Patent Application Laid-Open No. 2004-048873, a relatively high voltage is required for driving. Therefore, a reduction in the voltage for energizing the coil is demanded for the sake of further power saving. In the following description, art meeting such a demand will be considered.

FIG. 5 shows a simulation result obtained by surveying torque characteristics of a magnet provided in the above-mentioned driving apparatus or the like by means of a magnetic field analysis based on a finite element method. The abscissa axis represents a rotational position of the magnet, and the ordinate axis represents torque acting on the magnet. A line of 0 V (broken line) indicates a cogging torque at the time when a coil is stopped from being energized. FIG. 5 shows how the energization torque rises by raising the voltage for energizing the coil to 3 V and then to 5 V. As for the cogging torque, at points E1 and E2 shown in FIG. 5, when the magnet is about to rotate in a positive direction, it receives a negative force and starts returning to its original position. On the other hand, when the magnet is about to rotate in a reverse direction, it receives a positive force and is returned to its original position. In other words, the magnet assumes a cogging position where it is urged to be stably positioned at the point E1 or E2 due to magnetic force acting between the magnet and the outer magnetic pole portion. A point F in FIG. 5 represents an unstable position. The magnet assumes an unstably balanced state where a rotational force acts on one of the points E1 and E2 located straddling the point F even if the magnet is slightly shifted in phase at the point F. The magnet does not remain stopped at the point F because of vibrations or a change in posture and is stopped at the point E1 or E2, when the coil is not energized. On the assumption that the number of magnetized poles of the magnet is n, cogging stable points such as the points E1 and E2 exist at angular intervals of 360/n. A midpoint between the points E1 and E2 spaced apart from each other becomes the unstable point such as the point F. By being provided with rotation stoppers, the magnet can move within a range between the two stable positions. In FIG. 5, this can be realized by providing the magnet with the rotation stoppers at a position θ1' (corresponding to the first position) and at a position θ2' (corresponding to the second position).

In order to hold a lens barrel against gravity or vibrations during cessation of energization at each of the positions, a cogging torque of a certain magnitude or more (whose absolute value is equal to or larger than Cmin shown in FIG. 5) is required. For instance, the lens barrel can be held by setting the movable range of the magnet to a "movable range 1".

In order to activate the lens barrel against friction or gravity during energization at each of the positions, an energization torque of a certain magnitude or more (whose absolute value is equal to or larger than Tmin shown in FIG. 5) is required. Thus, the voltage of 3 V for energizing the coil is insufficient for activation of the lens barrel when the movable range of the magnet is set to the movable range 1. A higher voltage (energization with +5 V from the first position to the second position, and energization with −5 V from the second position to the first position) is required for activation of the lens barrel. This makes power saving difficult.

In order to activate the lens barrel with a lower voltage, it is conceivable to set the first position and the second position to θ1 and θ2, respectively, that is, to set the movable range of the magnet to a movable range 2. Then, at the first position, Tmin can be exceeded even when the voltage for energizing the coil is 3 V. Consequently, the lens barrel can be activated with a lower voltage from the first position to the second position. However, the cogging torque C1 at this moment is less than the torque Cmin required for holding the lens barrel. Accordingly, the lens barrel cannot be held in position due to the influence of gravity or vibrations during cessation of energization.

Therefore, if a construction in which the force for holding the lens barrel is equal to or larger than the aforementioned torque Cmin is adoptable, the lens barrel needs to be held reliably. In addition, the voltage required for moving the lens barrel from the first position to the second position needs to be lowered. The applicant of the present invention has devised a new driving apparatus of this type. The lens barrel can be activated from the second position to the first position by applying the same voltage (−5 V) as in the conventional art, even when the movable range of the magnet is set to the "movable range 2". Since the cogging torque is also larger than Cmin, the lens barrel can be held in position even when it is subjected to the influence of gravity or vibrations during cessation of energization at the second position.

SUMMARY OF THE INVENTION

According to the present invention, which offers a technical concept for achieving power saving while allowing a member to be moved to be held stably, there is provided a driving apparatus for moving the member to be moved from one abut end position to another abut end position including a stator for being excited through energization control of a coil, and a magnet rotatable around a center of its optical axis in accordance with excitation of the stator, in which the magnet has a magnetic force acting in the optical axis direction as well as a torque acting in a rotational direction.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

In the accompanying drawings:

FIG. 8A is a sectional view of the driving apparatus shown in FIG. 7 taken along a plane perpendicular to a rotation axis at a macro position;

FIG. 8B is a sectional view of the driving apparatus shown in FIG. 7 taken along a plane perpendicular to a rotation axis at a standard position.

DESCRIPTION OF THE PREFERRED EMBODIMENTS

Best modes for carrying out the present invention will be described below as first and second embodiments.

First Embodiment

FIGS. 1A, 1B, 2A, 2B, 3A, 3B, 4A, and 4B show an example in which a driving apparatus according to the first embodiment, which is utilized at a macro position as a first position or at a standard position as a second position, is used to change the focus of a lens 7.

Figure 1A:
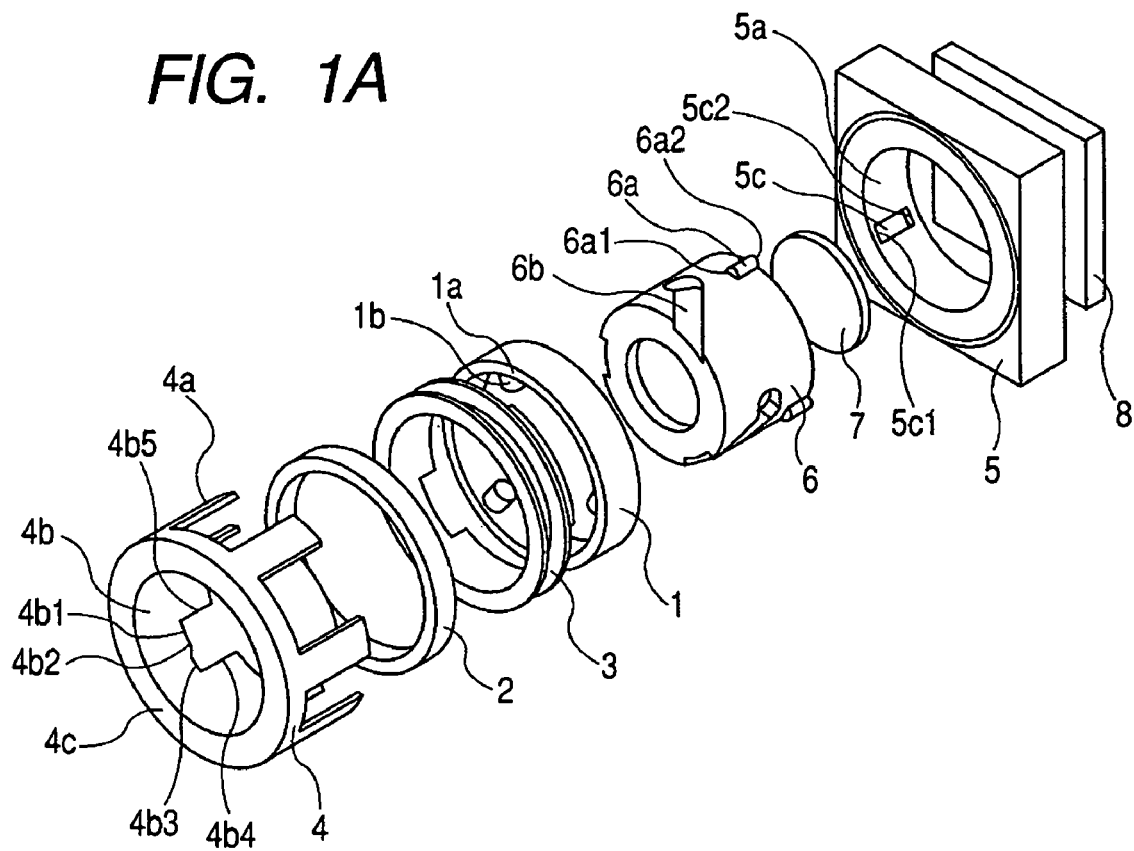
FIGS. 1A and 1B are perspective views showing a driving apparatus according to a first embodiment of the present invention.
Figure 1B:
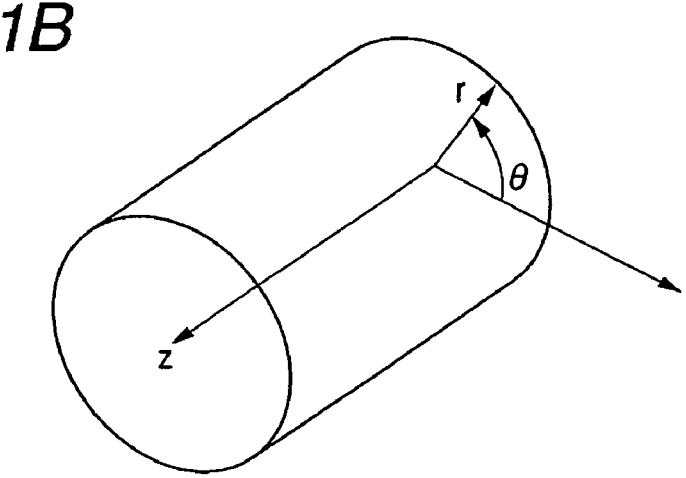
Figure 2A:
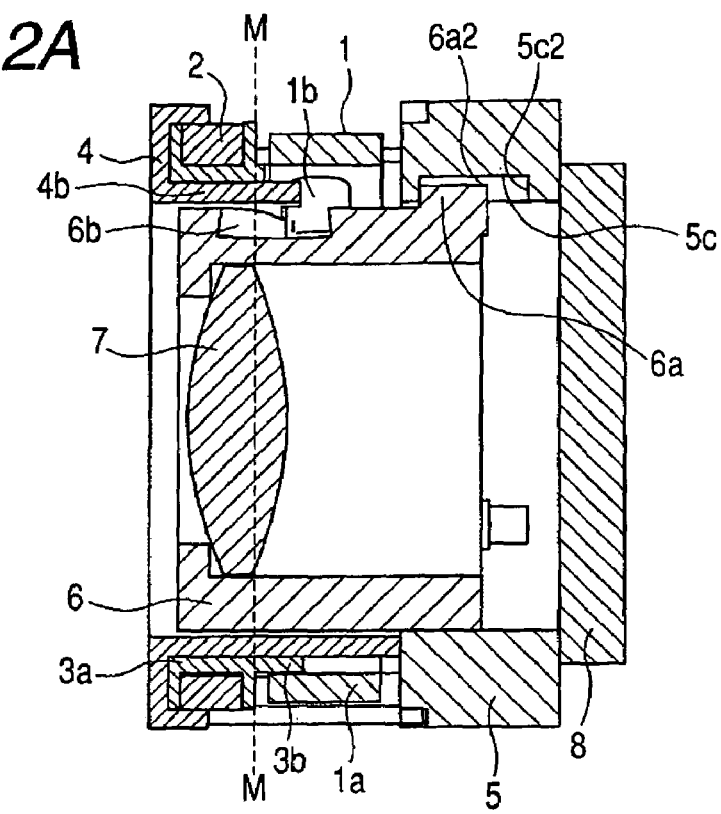
FIG. 2A is a sectional view of the driving apparatus shown in FIGS. 1A and 1B, taken at a macro position.
Figure 2B:
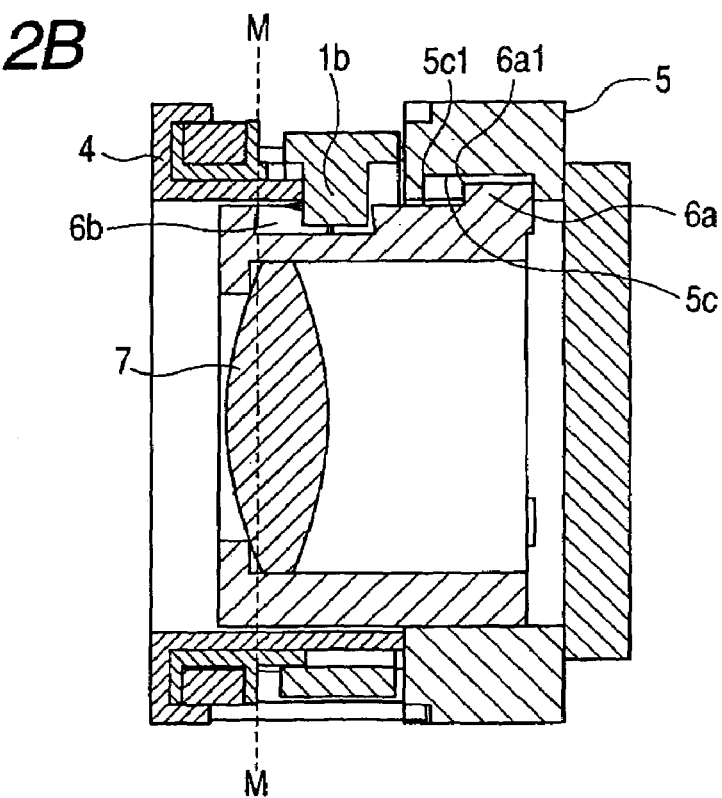
FIG. 2B is a sectional view of the driving apparatus shown in FIGS. 1A and 1B at a standard position.
Figure 3A:
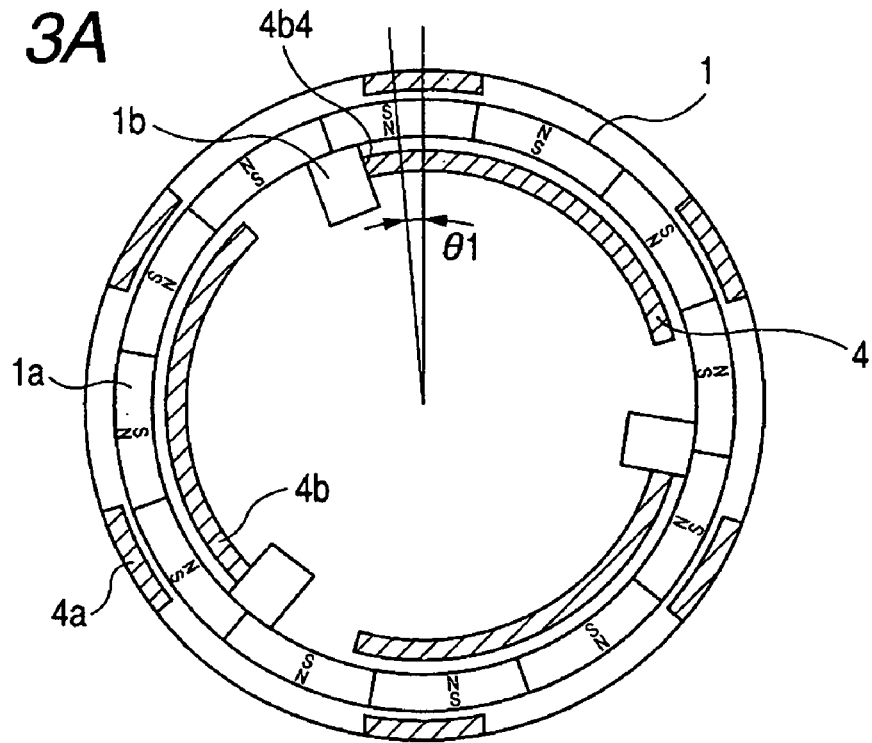
FIG. 3A is a sectional view of the driving apparatus shown in FIGS. 1A and 1B taken along a plane perpendicular to a rotation axis at the macro position.
Figure 3B:
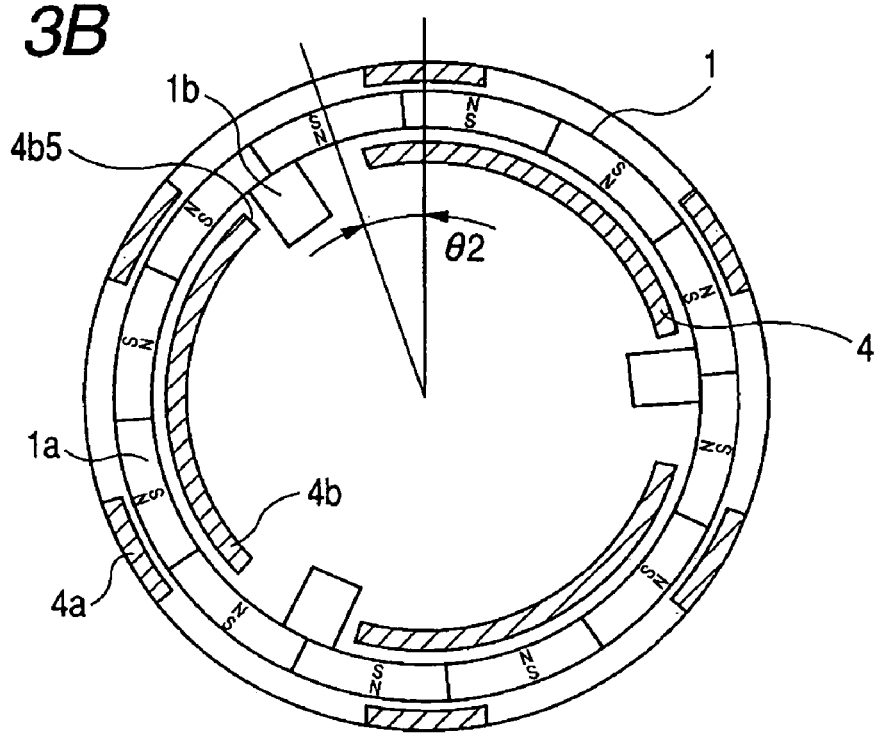
FIG. 3B is a sectional view of the driving apparatus shown in FIGS. 1A and 1B taken along a plane perpendicular to a rotation axis at the standard position.
Figure 4A:
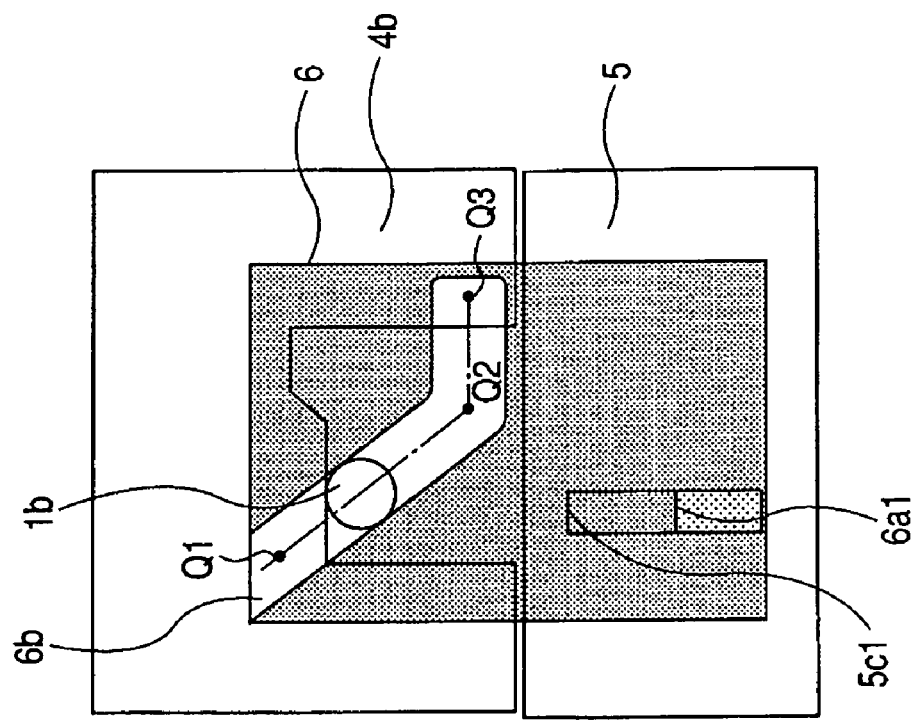
FIG. 4A is a schematic diagram showing a lens barrel holding state at the macro position at the time when a coil is stopped from being energized in the first embodiment of the present invention.
Figure 4B:
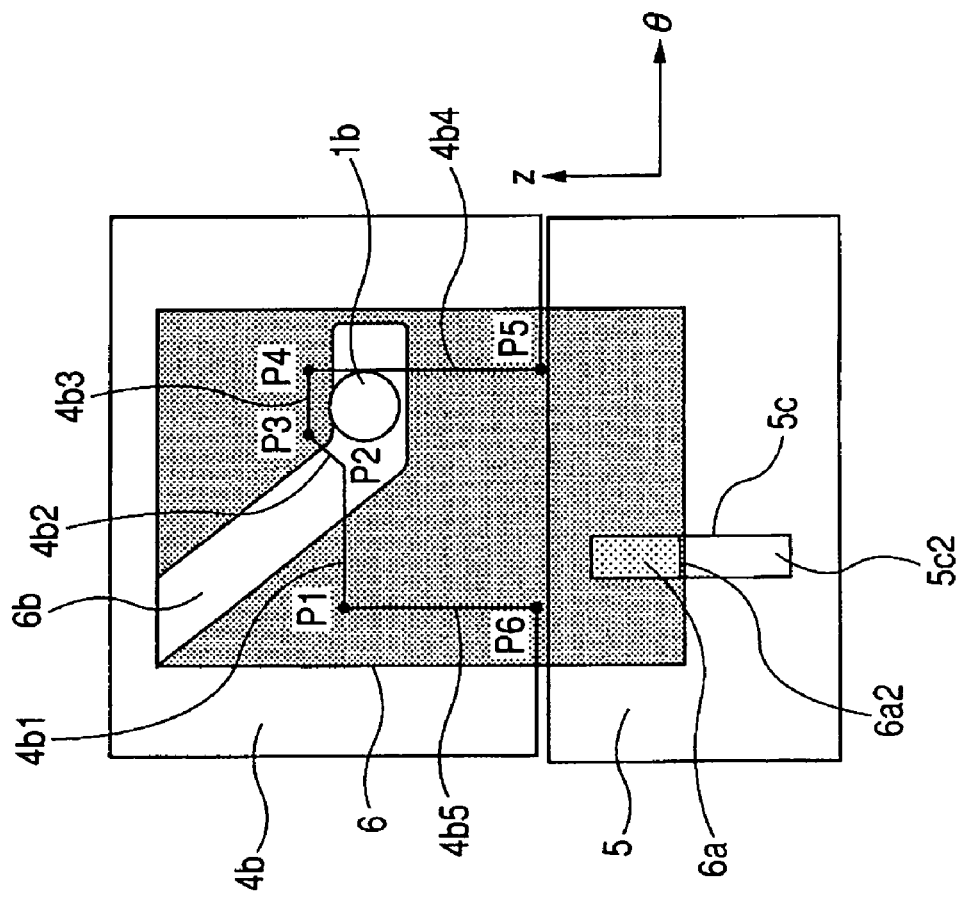
FIG. 4B is a schematic diagram showing a lens barrel holding state at the standard position at the time when the coil is stopped from being energized in the first embodiment of the present invention.

More specifically, FIGS. 1A and 1B are exploded perspective views of the driving apparatus, FIGS. 2A and 2B are sectional views of the driving apparatus at the macro position and the standard position respectively, FIGS. 3A and 3B are sectional views of the driving apparatus taken along planes perpendicular to the rotation axes at the macro position and the standard position, respectively, and FIGS. 4A and 4B are schematic views showing respective lens barrel holding states at the macro position (FIG. 4A) and the standard position (FIG. 4B) at the time when a coil 2 gets into a non-energized state. It is assumed in the first embodiment that the lens 7 is at the standard position when it is on a later-described sensor 8 side, and that the lens 7 is at the macro position when it is on a magnetic pole coupling portion 4c side of a later-described stator 4. A cylindrical coordinate system as shown in FIG. 1B is used as a coordinate system in the following description, where the positive direction of a z-axis is defined as a direction from the sensor 8 to the lens 7.

Referring to FIGS. 1A, 1B, 2A, 2B, 3A, 3B, 4A, and 4B, a hollow cylindrical magnet having the z-axis (see FIG. 1B) as its central axis and constituting a rotor is denoted by reference symbol 1. This magnet 1 has a magnetizing portion 1a. An outer peripheral surface of the magnetizing portion 1a is divided into n sections in a θ direction, which are alternately magnetized as south poles and north poles of the magnetizing portion 1a (see FIGS. 3A and 3B). Three columnar drive pins 1b are provided on an inner peripheral portion of the magnet 1. The drive pins 1b protrude radially inwardly and are arranged at angular intervals of 120°. A stable point of the magnet 1 in the z-axis direction is indicated by the line M—M in FIGS. 2A and 2B. As is apparent from FIGS. 2A and 2B, the magnet 1 is always located on the negative side with respect to the stable point in the z-axis direction and therefore always receives force acting in the positive direction of the z-axis.

Since the magnet 1 is constructed as a plastic magnet formed by injection molding, it can be manufactured as one piece even with its complicated shape having the drive pins 1b. Since a magnet obtained by injection molding has a thin resin coat formed on its surface, the amount of rust development is smaller than in case of a compression magnet, making it possible to dispense with a rust prevention treatment, such as painting. Furthermore, the magnet obtained by injection molding is free from adhesion of magnetic powder, which is problematic in the case of the compression magnet, and further from surface bulge which often occurs during rust proof painting, so it is possible to achieve improved quality. A mixture of Nd—Fe—B type rare earth magnetic powder and a thermoplastic resin binder material such as polyamide is used as the material for the magnet 1. The plastic magnet formed by injection molding of the mixture is used. Thus, while a magnet obtained by compression molding has a bending strength of about 500 kgf/cm$^2$, a magnet obtained by using, for example, polyamide resin as a binder material has a bending strength of 800 kgf/cm$^2$ or more. As a result, the magnet obtained by injection molding can be formed into the shape of a thin cylinder, which is impossible in the case of the magnet obtained by compression molding. By forming the magnet obtained by injection molding into the shape of a thin cylinder, the distance between outer magnetic pole portions and an inner magnetic pole portion of the later-described stator 4 can be set to be short, and a magnetic circuit having a low magnetic resistance therebetween can be realized. Thus, a large number of magnetic fluxes can be generated even with a small magnetomotive force when the later-described coil 2 is energized. As a result, the performance of an actuator is enhanced.

The coil 2 has a cylindrical shape, is concentric with the magnet 1, and arranged in line in the z-axis direction. The outer diameter of the coil 2 is approximately equal to that of the magnet 1. A bobbin made of an insulating material is denoted by reference symbol 3. As shown in FIGS. 2A and 2B, the bobbin 3 is composed of a winder-shaped portion 3a and a cylindrical rotor bearing portion 3b. The coil 2 is wound around the winder-shaped portion 3a. The outer diameter of the winder-shaped portion 3a is approximately equal to the inner diameter of a later-described stator outer cylinder 4a. The rotor bearing portion 3b is concentric with the winder-shaped portion 3a and is arranged in line in the z-axis direction. The outer diameter of the rotor bearing portion 3b is approximately equal to the inner diameter of the magnetizing portion 1a of the aforementioned magnet 1. The rotor bearing portion 3b rotatably supports the magnet 1. The rotor bearing portion 3b is provided with three notch portions through which the drive pins 1b pass.

The stator 4 is excited by energization of the coil 2. The stator 4 is made of a soft magnetic material and is composed of the outer cylinder 4a, an inner cylinder 4b, and the magnetic pole coupling portion 4c for coupling the outer cylinder 4a and the inner cylinder 4b with each other. A tip portion of the outer cylinder 4a is composed of a plurality of teeth extending in the z-axis direction. In other words, the outer cylinder 4a assumes a shape of comb teeth. The number of the teeth extending in the z-axis direction is half of the number n of the magnetized poles into which the magnet 1 is divided. Those teeth form outer magnetic pole portions. The outer magnetic pole portions are formed at angular intervals of an integral multiple of 720/n° in the θ direction. The number of the outer magnetic pole portions can be arbitrarily selected as long as it is equal to or smaller than the half of the number of the magnetized poles. In the first embodiment, the number n is set to 12, and the number of the outer magnetic pole portions is 6. The inner cylinder 4b assumes a shape of a hollow cylinder and constitutes an inner magnetic pole portion. The inner cylinder 4b is provided with three notch portions through which the drive pins 1b of the magnet 1 pass. The notch portions are arranged at angular intervals of 120°.

As shown in FIGS. 1A and 1B and FIGS. 4A and 4B, each of the notch portions is composed of a guide surface 4b1, a step surface 4b2, a flank 4b3, and rotation preventing surfaces 4b4 and 4b5. The rotation preventing surfaces 4b4 and 4b5 pass through later-described points P4 and P5, respectively, and are parallel to the z-axis. A movable range of the magnet 1 is set to "a movable range 2" (described later with reference to FIG. 5) by the rotation preventing surfaces 4b4 and 4b5. The guide surface 4b1 passes through later-described points P1 and P2, and is perpendicular to the z-axis. The step surface 4b2 assumes an arbitrary shape allowing it to pass through the later-described points P2 and P3. The flank 4b3 passes through the later-described points P3 and P4, and is perpendicular to the z-axis. Given that the coordinates of the points P1, P2, P3, and P4 from among the points P1, P2, P3, P4, P5 and P6, which constitute each of the notch portions, are $(\theta_{p1}, z1)$, $(\theta_{p2}, z1)$, $(\theta_{p3}, z3)$, and $(\theta_{p4}, z3)$, respectively, it turns out that $\theta_{p1}<\theta_{p2}<\theta_{p3}<\theta_{p4}$ and that $z3>z1$. By thus providing the inner cylinder 4b with the guide surface 4b1, the step surface 4b2, and the flank 4b3, the magnet 1 can be freely rotated about the z-axis at the later-described first position (macro position). It is also appropriate to provide the bobbin 3 with the guide surface 4b1, the step surface 4b2, and the flank 4b3.

The inner cylinder 4b forming the inner magnet pole portion of the stator 4 assumes a shape of a hollow cylinder in the case of the first embodiment, but may assume a shape of comb teeth as is the case with the outer magnetic pole portions extending in the axial direction of the outer cylinder 4a. However, if the outer magnetic pole portions assume the shape of comb teeth described above, magnetic fluxes passing between the outer magnetic pole portions and the inner magnetic pole portion pass between the outer magnetic pole portion in the shape of comb teeth and a position on the inner magnetic portion onto which the shape of the outer magnetic pole portions is projected. Therefore, the inner magnetic pole portion may assume a shape of a simple hollow cylinder.

The bobbin 3 and the coil 2 are fixed between the outer cylinder 4a and the inner cylinder 4b of the stator 4 by adhesion or the like, and the stator 4 is excited by energizing the coil 2. The outer cylinder 4a (the outer magnetic pole portions) and the inner cylinder 4b (the inner magnetic pole portion) of the stator 4 are so provided as to face an outer peripheral surface and an inner peripheral surface of the magnetizing portion 1a of the magnet 1, respectively, and to sandwich the magnetizing portion 1a of the magnet 1 with a predetermined clearance (see FIGS. 3A and 3B). Accordingly, magnetic fluxes generated by the coil 2 cross the magnet 1 located between the outer magnetic pole portion and the inner magnetic pole portion, so they effectively act on the magnet 1 as a rotor, thereby making it possible to enhance the output of the actuator.

As described above, the magnet 1 is made of a plastic magnet material formed by injection molding, and therefore can be made very small in thickness in the radial direction of its cylindrical shape. Thus, the distance between the outer magnetic pole portions and the inner magnetic pole portion of the stator 4 can be made very short, and the magnetic resistance of a magnetic circuit composed of the coil 2 and the stator 4 can be made low. Thus, a large number of magnetic fluxes can be generated with a small current, thereby achieving an increase in output of the actuator, a reduction in power consumption, and a reduction in the size of the coil.

As described above, the magnet 1, the bobbin 3, the coil 2, and the stator 4 constitute the actuator in the driving apparatus of the first embodiment.

A bottom board is denoted by reference symbol 5. The bottom board 5 has a hole 5a having the z-axis as its central axis. The diameter of the hole 5a is approximately equal to the outer diameter of a later-described lens barrel 6. Rotation stopping grooves 5c are provided in a lateral surface of the hole 5a. It is sufficient to provide at least one rotation stopping groove 5c. In the first embodiment, however, three rotation stopping grooves 5c are arranged at angular intervals of 120° in order to position the lens barrel 6 to be parallel to the later-described sensor 8. Each of the rotation stopping grooves 5c is in a shape of an axially extending long column, and has its front surface in the z-axis direction serving as a macro end abutment surface 5c1 and its rear surface in the z-axis direction serving as a standard end abutment surface 5c2. The macro end abutment surface 5c1 and the standard end abutment surface 5c2 are respectively opposed to a macro end abutment portion 6a1 and a standard end abutment portion 6a2 of the later-described lens barrel 6 in the z-axis direction.

The cylindrical lens barrel is denoted by reference symbol 6. The later-described lens 7 can be fixed in the lens barrel 6. The lens barrel 6 is provided, on its outer peripheral portion, with columnar rotation stopping keys 6a extending in the z-axis direction, which are equal in number to the rotation stopping grooves 5c. The rotation stopping keys 6a can be fitted into the rotation stopping grooves 5c to axially slide with the bottom board 5. Each of the rotation stopping keys 6a has its front surface in the z-axis direction serving as a macro end abutment portion 6a1 and its rear surface in the z-axis direction serving as a standard end abutment portion 6a2. In order to reduce friction, the rotation stopping keys 6a may also be formed as pins extending in an "r" direction.

The lens barrel 6 is provided, on its outer peripheral surface, with three cam grooves 6b that are arranged at angular intervals of 120°. As shown in FIGS. 4A and 4B, each of the cam grooves 6b is composed of a helicoid portion and a horizontal portion. This horizontal portion forms a cam locus about the center of an optical axis. The helicoid portion forms a cam locus in a direction different from that of the horizontal portion. More specifically, the central axis of the helicoid portion is a straight line or a curve passing through points Q1 and Q2 shown in FIG. 4B. The central axis of the horizontal portion is a straight line extending perpendicularly to the z-axis and passing through the points Q2 and Q3 shown in FIG. 4B. Given that the coordinates of the points Q1, Q2, and Q3 constituting the central axis of the helicoid are $(\theta_{q1}, z5)$, $(\theta_{q2}, z6)$, and $(\theta_{q3}, z6)$, respectively, it turns out that $\theta_{q1} < \theta_{q2} < \theta_{q3}$ and that $z5 > z6$.

Each of the cam grooves 6b slidably abuts on the drive pin 1b of the magnet 1. When the helicoid portion of the cam groove 6b abuts on the drive pin 1b as shown in FIG. 4B, the lens barrel 6 is movable in the z-axis direction through rotation of the magnet 1. When the horizontal portion of the cam groove 6b abuts on the drive pin 1b, the lens barrel 6 and the magnet 1 are free in the rotational direction about the z-axis and integrally movable (between the macro position and the standard position) in the z-axis direction. Due to the cam grooves 6b formed in the lens barrel 6 and assuming the shape of a cylindrical cam, and the guide surface 4b1, the step surface 4b2, and the flank 4b3 formed in the stator 4 and collectively assuming a shape of an end surface cam, a force in the z-axis direction (described later) which acts on the magnet 1 is transmitted to the lens barrel 6 at the macro position (first position), and a rotational force acting on the magnet 1 is converted into a force in the z-axis direction and transmitted to the lens barrel 6 at the standard position (second position). As a result, the lens barrel 6 can move in the z-axis direction as the magnet 1 rotates between the macro position and the standard position while realizing a compact construction.

The lens, which is denoted by reference symbol 7, is supported by an inner diameter portion of the lens barrel 6. The sensor, which is denoted by reference symbol 8, is a sensor for electronically recording light, such as a CCD or a C-MOS. The sensor 8 is fixed to the aforementioned bottom board 5 by means of a screw, an ultraviolet curing resin, or the like.

By adopting the foregoing configuration, the let-out amount of the lens can be determined only through the dimensions of the rotation stopping keys 6a of the lens barrel 6 and the rotation stopping grooves 5c of the bottom board 5. Therefore, the number of machining dimension errors piled up is smaller in comparison with a case where the let-out amount of the lens is determined through many parts. Furthermore, the rotation stopping keys 6a and the rotation stopping grooves 5c each assume simple columnar shapes, so they can be accurately machined and positioned. Also, the radial dimension of the driving apparatus can be reduced. That is, the radius of the entire driving apparatus, which is expressed as (the radius of the lens 7)+(the thickness of the lens barrel 6)+(the respective thicknesses of the inner cylinder 4b and the outer cylinder 4a)+(the thickness of the coil 2)+(the thickness of the bobbin 3), can be made smaller than that of a driving apparatus in which the optical axis of the lens 7 does not coincide with the rotation axis of the actuator.

Figure 5:
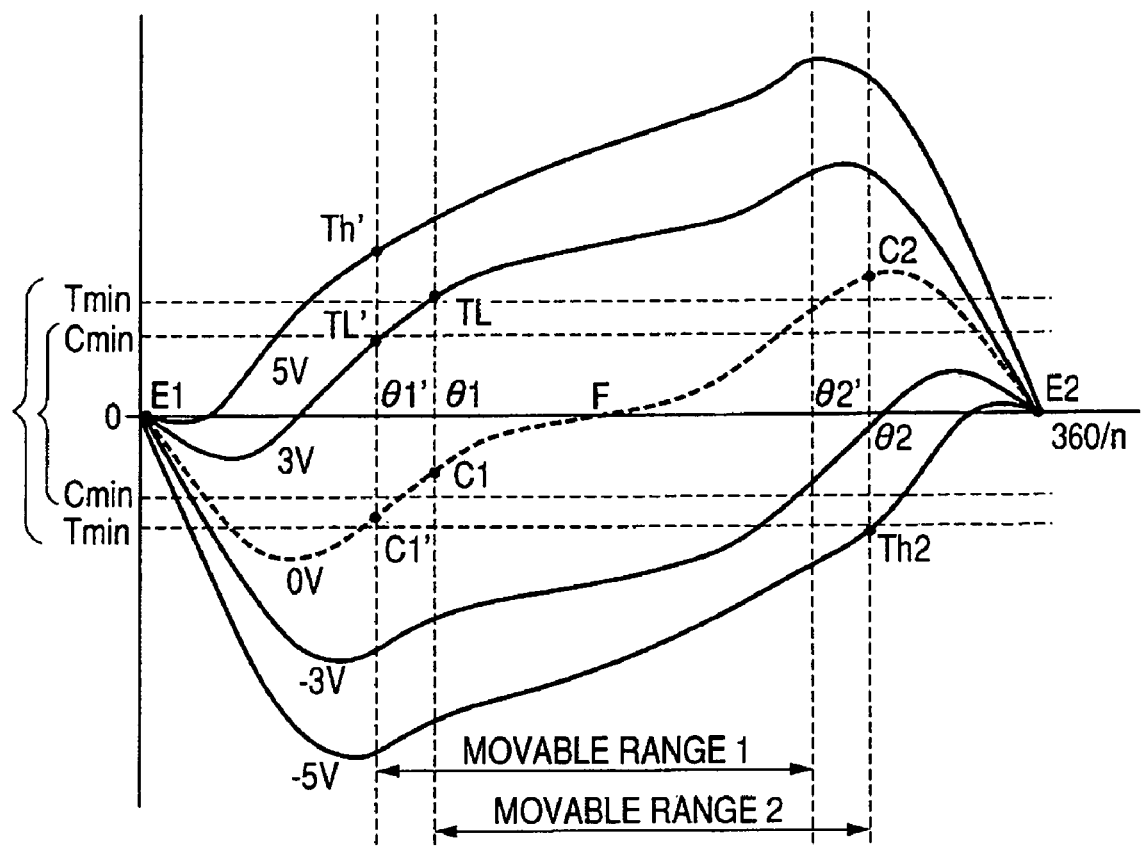
FIG. 5 is a graph showing torques applied to a magnet in the first embodiment of the present invention.
Figure 6:
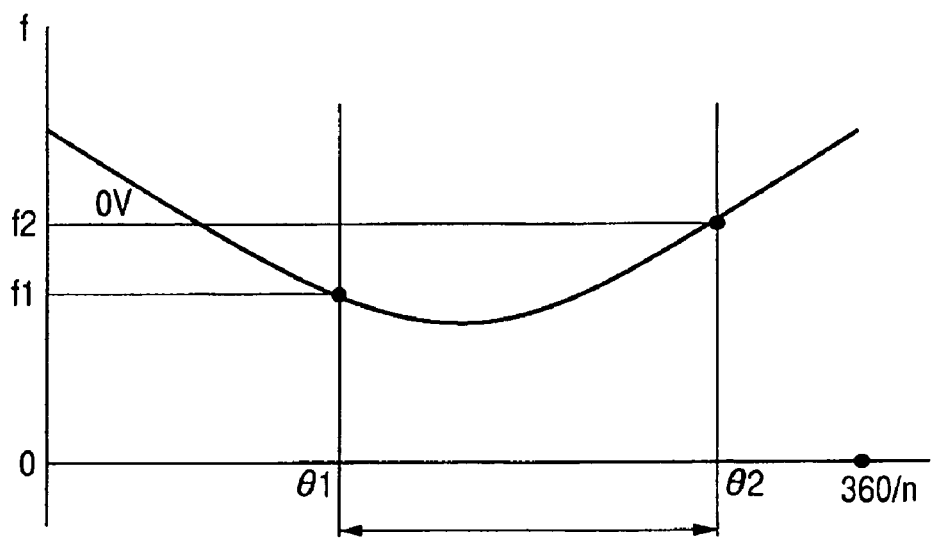
FIG. 6 is a graph showing an axial force applied to the magnet in the first embodiment of the present invention.

Next, the characteristics of the actuator having the above-mentioned construction when the coil 2 is in a non-energized state will be described. The magnet 1 is always located on the negative side with respect to the stable point (the line M—M in FIGS. 2A and 2B) in the z-axis direction and therefore always receives a force in the positive direction of the z-axis. Accordingly, when the coil 2 gets into the non-energized state, the magnet 1 receives a magnetic force acting between itself and the stator 4 (more specifically, the magnetic pole coupling portion 4c as will be described later), that is, an attraction force acting in the z-axis direction. FIG. 5 shows a torque (cogging torque, energization torque) in the θ direction which is applied to the magnet 1. The movable range of the magnet 1 is set to "the movable range 2" by the rotation preventing surfaces 4b4 and 4b5 as described above. FIG. 6 shows a force f in the z-axis direction which is applied to the magnet 1. Referring to FIG. 6, the abscissa axis represents a rotation phase of the magnet 1, and the ordinate axis represents forces f1 and f2 acting in the z-axis direction at first and second positions (θ1 and θ2) which are applied to the magnet 1 by the stator 4.

First of all, in the θ direction, the stable point of the magnet 1 is a position corresponding to E1 or E2 shown in FIG. 5 when the coil 2 of the actuator is not energized as described above. In the z-axis direction, when the coil 2 is in the non-energized state, the stator 4 attracts both the north and south poles regardless of the pole of the magnet 1. Accordingly, the magnet 1 receives the forces f1 and f2 in such a direction (the z-axis direction) that the magnet 1 is attracted toward the side in which a larger volume of a ferromagnetic material exists, that is, toward the magnetic pole coupling portion 4c of the stator 4, regardless of the rotation angle position of the magnet 1.

By utilizing the aforementioned characteristics of the actuator, the magnet 1 can be held in position in the direction of its rotation axis (z-axis) at the macro position shown in FIGS. 2A, 3A, and 4A and at the standard position shown in FIGS. 2B, 3B, and 4B, respectively, when the coil 2 is in the non-energized state.

When the Lens is at the Macro Position

FIG. 4A is a schematic view showing a state where the lens barrel 6 is positioned when the lens is at the macro position. The magnet 1 assumes a rotation angle position θ1 shown in FIG. 3A through abutment of the drive pin 1b of the magnet 1 with the rotation preventing portion 4b4. The magnet 1 receives a cogging torque C1 traveling toward the stable point E1. However, this torque is transmitted to the rotation preventing portion 4b4, so it is not transmitted to the lens barrel 6. In this case, the magnet 1 is not supported by the stator 4 in the z-axis direction, and is movable in the z-axis direction. The drive pin 1b of the magnet 1 abuts on the horizontal portion of the cam groove 6b, and moves integrally with the lens barrel 6 in the z-axis direction. At this moment, the magnet 1 is absorbed toward the magnetic pole coupling portion 4c of the stator 4 due to the force f1 acting between the magnet 1 and the stator 4 in the positive direction of the z-axis, and the macro end abutment portion 6a1 is pressed against the macro end abutment portion 5c1 due to this force. As a result, the lens barrel 6 is positioned in the z-axis direction. The force f1 acting in the z-axis direction serves as a holding force, so the lens barrel 6 can be stably held in position even against gravity or vibrations.

It is appropriate that the cogging torque C1 in this case is smaller than a cogging torque C2 in the standard mode. As described above, when the cogging torque is reduced, the energization torque at that time is increased. In other words, the voltage required for driving can be lowered if the lens barrel 6 can be held in position with a smaller cogging torque.

When the Lens is at the Standard Position

FIG. 4B is a schematic view showing a state where the lens barrel 6 is positioned when the lens is at the standard position. The magnet 1 assumes an angular position θ2 shown in FIG. 3B and receives the cogging torque C2 traveling toward the stable point E2. In this case, the lens barrel 6 receives, from the drive pin 1b via the cam grooves 6b, a force urging a movement in the negative direction of the z-axis. As a result, the standard end abutment portion 6a2 of the lens barrel 6 is pressed against the standard end abutment surface 5c2, and the lens barrel 6 is positioned in the z-axis direction. In other words, the magnet 1 is kept from rotating by the lens barrel 6, which is held in position in the z-axis direction due to the cogging torque C2. The cogging torque C2 at this moment needs to be equal to or larger than a torque Cmin allowing the lens barrel 6 to be held stably against gravity or vibrations. The force f2 in the z-axis direction which acts on the magnet 1 at this moment is restricted by the guide surface 4b1 and is not transmitted to the lens barrel 6.

As shown in FIG. 5, in general, within an angular position (e.g., θ1') with a stronger cogging torque, the magnitude of energization torque at an angular position (θ1) with a weaker cogging torque is smaller than at an angular position with a stronger cogging torque (C1'>C1 and TL1'<TL). Therefore, in order to generate a torque required for activation at an angular position requiring a strong cogging torque, measures such as the enhancement of voltage, and the change in the number of turns of the coil 2 are required. For this reason, however, energy saving, space saving, and the like are sacrificed. In the case where the driving apparatus is held at its both ends using a cogging torque, the angular positions of those ends for obtaining the cogging torque required for holding the driving apparatus and an energization torque required for driving are automatically determined. As a result, the degree of design freedom is reduced.

Then, if the driving apparatus is held using the attraction force (the force f) in the z-axis direction which acts between the stator 4 and the magnet 1 when the lens is at the macro position as in the aforementioned first embodiment, a high cogging torque for holding the driving apparatus in position is not required when the lens is at the macro position. Accordingly, a magnet position (θ1 in FIG. 5) with a lower cogging torque and a higher energization torque can be set as the macro position, and the lens barrel 6 can be activated at a low voltage (3V in FIG. 5). This is advantageous in terms of power saving and size reduction of the driving apparatus. Since the angular position in the macro mode can be freely selected, the degree of design freedom on the angular position of the magnet 1 is also increased.

Next, how the driving apparatus is driven will be described with reference to FIGS. 3A, 3B, 4A, and 4B. As described above, the magnet 1 is held at the angular position θ1 shown in FIG. 3A even if the coil 2 is in the non-energized state when the lens is at the macro position. When a voltage of +3 V is applied to the coil 2 in this case, the stator 4 is excited, and the outer magnetic pole portions (the outer cylinder 4a) become south poles. Then, the magnetizing portion 1a of the magnet 1 opposed to the outer magnetic pole portions receives a repulsive force, and the magnet 1 receives a torque TL shown in FIG. 5 to be stably activated, and rotates in a θ-positive direction (counterclockwise in FIG. 3A). When the drive pin 1*b* has passed the flank 4*b*3, it runs on the guide surface 4*b*1 via the step surface 4*b*2, and the magnet 1 is prevented from moving in the positive direction of the z-axis. When the drive pin 1*b* comes into abutment with the helicoid portion of the cam groove 6*b*, the lens barrel 6 moves in the negative direction of the z-axis as the magnet 1 rotates. Then, the standard end abutment portion 6*a*2 abuts the standard end abutment surface 5*c*2 opposed thereto in the z-axis direction, thereby making a shift to a standard mode shown in FIG. 3B. As described above, the lens barrel 6 is stably held at this position even if energization is stopped at this moment. Meanwhile, the lens barrel 6 is prevented from moving in its rotational direction by the rotation stopping keys 6*a*, so it moves straight in the negative direction of the z-axis (downward in FIGS. 4A and 4B).

Next, when a voltage of −5 V is applied to the coil 2 with the lens 7 positioned at the standard position, the outer magnetic pole portions are excited to north poles, and the magnet 1 receives an energization torque Th2 to be activated, and rotates in a θ-negative direction (clockwise in FIG. 3B). While the drive pin 1*b* is in abutment with the helicoid portion of the cam groove 6*b*, the lens barrel 6 moves in the positive direction of the z-axis as the magnet 1 rotates. When the magnet 1 rotates and the angular position of the drive pin 1*b* passes the point P2, the magnet 1 becomes free from the limitation of movement in the positive direction of the z-axis, which is imposed by the guide surface 4*b*1 of the stator 4. At the same time, the drive pin 1*b* comes into abutment with the horizontal portion of the cam groove 6*b*, and the lens barrel 6 slightly moves together with the magnet 1 in the positive direction of the z-axis. Then, the macro end abutment portion 6*a*1 abuts the macro end abutment surface 5*c*1 opposed thereto in the z-axis direction, thereby making a shift to a macro mode shown in FIG. 3A.

By thus changing over the direction of energization of the coil 2, the position of the lens barrel 6 (the lens 7) can be stably changed over between two positions, that is, the standard position and the macro position.

According to the aforementioned first embodiment, while the energization torque needs to be equal to or larger than a certain value (Tmin) so as to overcome friction or gravity, it is desirable to lower the voltage (i.e., as shown in FIG. 5, 3 V is desirable). Therefore, referring to FIG. 5, the energization torque with 3 V is set to TL, which is equal to or larger than Tmin, by shifting the first position from θ1' to θ1 and the second position from θ2' to θ2, namely, by shifting the movable range of the magnet 1 from "the movable range 1" to "the movable range 2" (by means of the rotation preventing portions 4*b*4 and 4*b*5). As a result, the lens 6 can be activated at the first position. In order to hold the lens barrel 6 against gravity or vibrations when the coil 2 is in the non-energized state, the cogging torque C1 in this case is insufficient for the first position (θ1). Thus, the magnet 1 is shifted in position in the negative direction of the z-axis with respect to the stable point (the line M—M in FIGS. 2A and 2B) in the z-axis direction, thereby holding the lens barrel 6 utilizing the force f1 acting in the z-axis direction. The lens barrel 6 can be activated at the second position (θ2) by setting the voltage to −5 V as in the case of the conventional art. The lens barrel 6 can be held by setting this second position to a position separate from the stable point E2 and generating the cogging torque C2, which is larger than Cmin and travels toward the stable point E2 at the second position.

That is, the lens barrel 6 can be held at the first position utilizing the force f1 acting in the z-axis direction, so the cogging torque C1 may be small. Thus, the lens barrel 6 can be activated even when the voltage for activating the lens barrel 6 to move it from the first position to the second position is set to 3 V (TL, which is larger than Tmin). Thus, the lens barrel 6 as a driven member can be stably held at the first position, and the voltage required for changing over the position of the lens barrel 6 from the first position to the second position can be lowered. As a result, power saving can be achieved.

Since the angular position at the time when the lens 7 is at the macro position can be freely selected, the degree of design freedom on the angular position of the magnet 1 is also increased.

Furthermore, the lens barrel 6 can be held at the second position due to the magnetic attraction force acting in the rotational direction. As a result, the optical performance of the lens 7 can be stabilized. Since the let-out amount of the lens 7 can be determined with a small number of parts at this moment, accurate positioning can be ensured.

As another effect, the magnetic fluxes generated through energization of the coil 2 pass across the magnet 1 located between the outer magnetic pole portions and the inner magnetic pole portion and thus operate effectively. Since the outer magnetic pole portions 4*a* assume the shape of teeth or comb teeth extending parallel to the axial direction of the cylindrical magnet 1, the diameter dimension of the outer magnetic pole portions can be made smaller than that of the outer magnetic pole portions composed of asperities radially extending toward the axial center. Thus, the cylindrical actuator having a small difference between its outer diameter and its inner diameter can be realized. Since the coil 2 is constructed as a single piece, a control circuit for energization is also simplified, and a low cost can also be ensured.

Second Embodiment

Next, a driving apparatus according to a second embodiment of the present invention will be described with reference to FIGS. 7 to 9.

Figure 7:
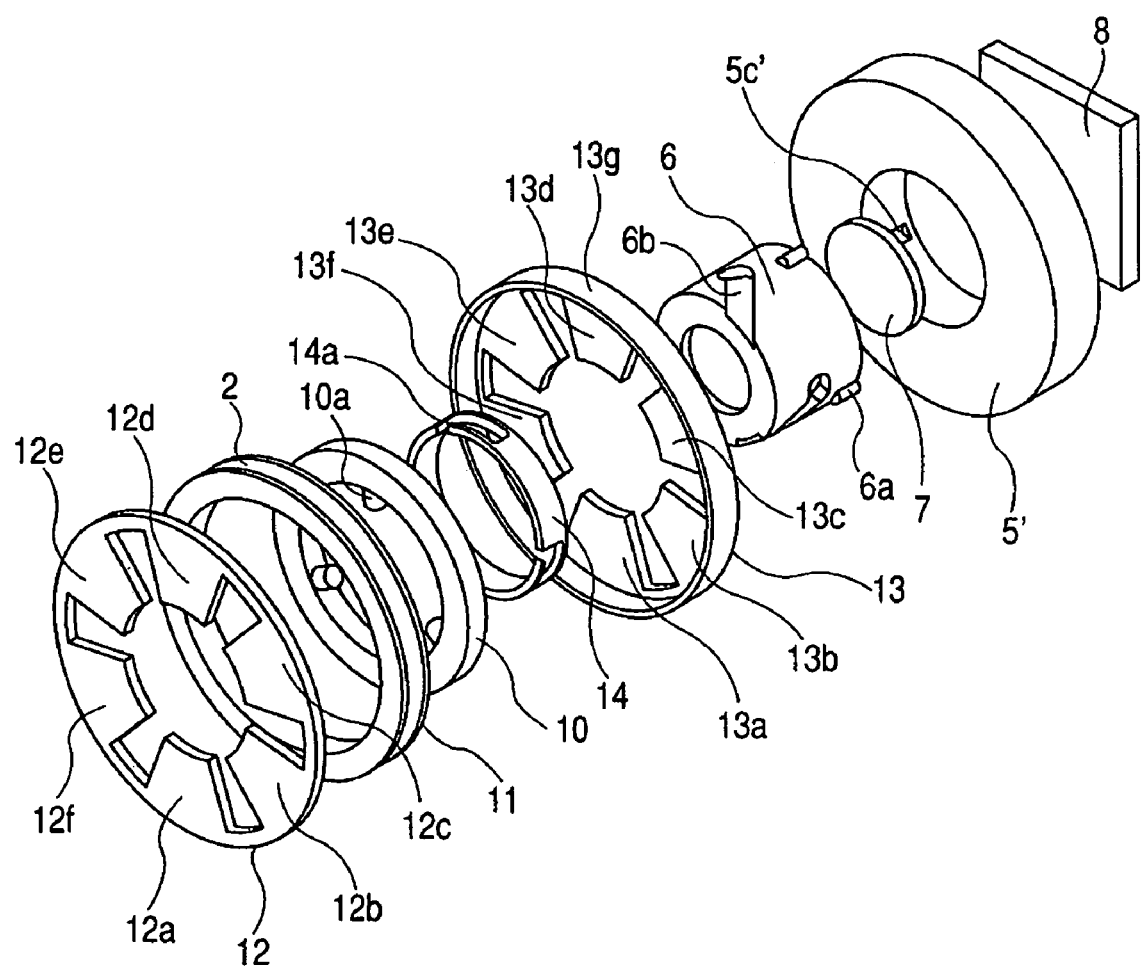
FIG. 7 is an exploded perspective view of a driving apparatus according to a second embodiment of the present invention.

FIG. 7 is an exploded perspective view of a driving apparatus according to the second embodiment of the present invention. FIGS. 8A and 8B are sectional views of the driving apparatus taken along a plane perpendicular to rotation axes at a macro position and a standard position, respectively. FIG. 9 is a view showing a construction of a main portion of a bearing shown in FIGS. 7, 8A, and 8B. Components identical to those shown in FIGS. 1A and 1B are denoted by the same reference symbols, and a detailed description thereof is omitted. Although a bottom board in the second embodiment of the present invention has a function similar to that of the bottom board 5 shown in FIGS. 1A and 1B, it is partially different in shape from the bottom board 5 and thus is denoted by 5'.

Figure 9:
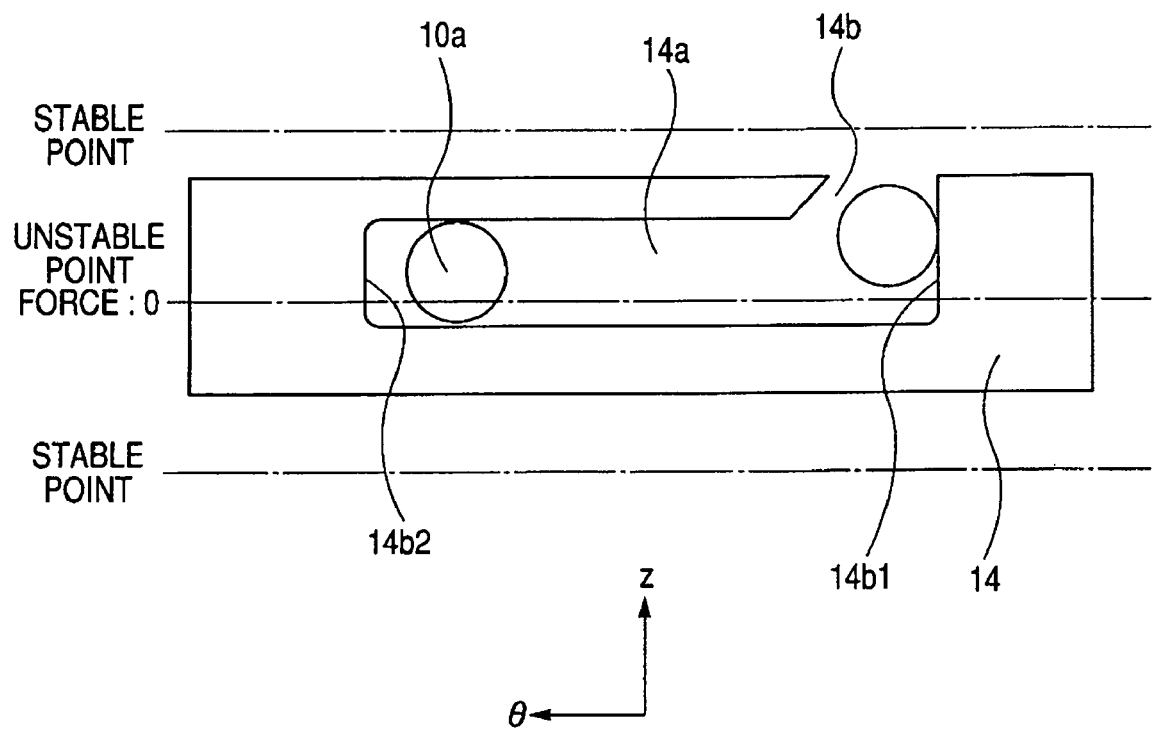
FIG. 9 is a view showing a positional relationship between a bearing and a movable range of a magnet in the second embodiment of the present invention.

Referring to FIGS. 7 to 9, a hollow disc-shaped magnet that is rotatably held around its center serving as a rotational center is denoted by 10. A surface of the magnet 10 perpendicular to a virtual axis serving as the rotational center is divided into n sections (twelve sections in this second embodiment) in the angular direction extending from the virtual axis as the center. Those sections are alternately magnetized as south poles and north poles. The magnet 10 is provided, on its inner peripheral portion, with three columnar drive pins 10*a* protruding radially inwardly, which are arranged at angular intervals of 120°. The coil 2 is disposed radially outwardly to the magnet 10, concentrically therewith, and axially overlapping therewith.

A bobbin made of an insulating material is denoted by 11. The coil 2 is wound around the bobbin 11. A first stator made of a soft magnetic material is denoted by 12. The first stator 12 has first magnetic pole portions 12a, 12b, 12c, 12d, 12e, and 12f that are excited through energization of the coil 2. The first magnetic pole portions 12a to 12f are opposed to a plane perpendicular to the axial direction of the disc-shaped magnet 10, with a predetermined clearance left therebetween, respectively. The first magnetic pole portions 12a to 12f are constructed of teeth in the shape of comb teeth extending radially inwardly in the magnet 10. Tip portions of the respective first magnetic pole portions 12a to 12f of the first stator 12 are constructed of a plurality of teeth extending in the radial direction of the magnet 10. In other words, those tip portions assume the shape of comb teeth. The number of the extending teeth is half of the number n of the magnetized sections into which the magnet 10 is divided. The teeth (the number of which is six in the second embodiment of the present invention) are arranged at equal angular intervals of $720/n°$ ($60°$ in the second embodiment of the present invention). When the coil 2 is energized, all the first magnetic pole portions 12a to 12f are so excited as to become identical in polarity.

A second stator made of a soft magnetic material is denoted by 13. The second stator 13 has second magnetic pole portions 13a, 13b, 13c, 13d, 13e, and 13f that are excited through energization of the coil 2. The second magnetic pole portions 13a to 13f are opposed to the plane of the disc-shaped magnet 10 perpendicular to the axial direction thereof, with a predetermined clearance left therebetween, respectively. The second magnetic pole portions 13a to 13f are constructed of teeth in the shape of comb teeth extending radially inwardly in the magnet 10. Tip portions of the respective second magnetic pole portions 13a to 13f of the second stator 13 are constructed of a plurality of teeth extending in the radial direction of the magnet 10. In other words, those tip portions assume the shape of comb teeth. The number of the extending teeth is half of the number n of the magnetized sections into which the magnet 10 is divided. The teeth are arranged at equal angular intervals of $720/n°$ ($60°$ in the second embodiment of the present invention).

The second magnetic pole portions 13a to 13f of the second stator 13 are formed at positions opposed to the first magnetic pole portions 12a to 12f of the first stator 12, respectively, with the magnet 10 interposed therebetween. The magnetic pole portions 12a to 12f and the magnetic pole portions 13a to 13f of the first stator 12 and the second stator 13, respectively, are magnetically coupled to one another by an outer wall portion 13g covering an outer periphery of the coil 2.

The aforementioned coil 2, the aforementioned first stator 12, and the aforementioned second stator 13 constitute the magnetic circuit. When the coil 2 is energized, all the first magnetic pole portions 12a to 12f are so excited as to become identical in polarity. However, the first magnetic pole portions 12a to 12f of the first stator 12 and the second magnetic pole portions 13a to 13f of the second stator 13 are so excited to become different in polarity from each other.

A bearing made of a nonmagnetic material is denoted by 14. The bearing 14 is provided, in its circumferential direction, with three long notch portions 14a to be penetrated by the drive pins 10a of the magnet 10, respectively. An outer peripheral portion of the bearing 14 abuts on an inner peripheral surface of the magnet 10, so the magnet 10 is rotatably held. Portions having a function similar to that of the rotation preventing portions 4b4 and 4b5 of the stator 4 in the aforementioned first embodiment (i.e., the function of setting the movable range of the magnet 10 to the "movable range 2" of FIG. 5) are denoted by 14b1 and 14b2.

FIG. 9 shows a positional relationship between the bearing 14 and the movable range of the magnet 10. When the coil 2 is stopped from being energized, the magnet 10 receives magnetic attraction force from both the first magnetic pole portions 12a to 12f and the second magnetic pole portions 13a to 13f. Accordingly, when the magnet 10 has come into contact with the first magnetic pole portions 12a to 12f or the second magnetic pole portions 13a to 13f, each of the contract portions is an axial stable point of the magnet 10, and an intermediate point between each of them and the magnet 10 is an unstable point at which the axial magnetic force acting on the magnet 10 is 0.

Therefore, if the bearing 14 (the notch portion 14a) is disposed and the movable range of the magnet 10 is slightly displaced in the z-axis direction from the unstable point as shown in FIG. 9, the magnet 10 always receives a force acting in the positive direction of the z-axis (in FIG. 9, upward direction, and in FIGS. 8A and 8B, leftward direction).

The notch portion 14a has a relief portion 14b at an angular position where the magnet 10 assumes the first position (the macro position, θ1 of FIG. 5). Thus, the magnet 10 can be moved in the positive direction of the z-axis at the first position. As a result, as is the case with the foregoing first embodiment, at the first position, it is possible to move the lens barrel 6 and the drive pins 10a of the magnet 10 integrally in the positive direction of the z-axis, press the macro end abutment portion 6a1 against the macro end abutment portion 5c1', and lower the voltage required for driving from the first position to the second position (from the macro position to the standard position in the second embodiment of the present invention).

As described above, the magnet 10, the coil 2, the bobbin 11, the first stator 12, the second stator 13, and the bearing 14 constitute the actuator in the driving apparatus of the second embodiment.

With the above-mentioned construction, the magnetic poles can be formed while minimizing the thickness of the actuator. That is, when the magnetic pole portions are formed of the asperities extending parallel to the axial direction as in the case of the aforementioned first embodiment, the actuator is correspondingly increased in thickness. In the second embodiment, however, since the magnetic pole portions assume the shape of comb teeth extending radially, the dimension in the direction parallel to the rotation axis of the driving apparatus constituting a stepper motor can be minimized. In other words, in comparison with the aforementioned first embodiment, the second embodiment of the present invention causes an increase in the size of the driving apparatus in the radial dimension thereof but can achieve a reduction in the size of the driving apparatus in the rotation axis direction.

As is the case with the first embodiment of the present invention, the position of the lens 7 can be stably changed over between two positions, the standard position and the macro position by switching the direction in which the coil 2 is energized. When the lens 7 is at the macro position at that moment, a high cogging torque for position holding is not required, and the voltage for a changeover from the macro position to the standard position can be lowered. As a consequence, as is the case with the foregoing first embodiment, a power-saving driving apparatus can be realized.

The present invention is applicable not only to a driving apparatus for changing over the position of a lens between a macro position and a standard position but also to a driving apparatus for changing over the position of a lens between a wide-angle position and a telescopic position, a driving apparatus for changing over the position of a lens between a storage position and a shooting position, a driving apparatus for changing over the position of a lens between a shutter closed position and an shutter open position, and the like.

As many apparently widely different embodiments of the present invention can be made without departing from the spirit and scope thereof, it is to be understood that the invention is not limited to the specific embodiments thereof except as defined in the claims.

This application claims priority from Japanese Patent Application No. 2004-373255 filed on Dec. 24, 2004, which is hereby incorporated by reference herein.

What is claimed is:

1. A driving apparatus comprising:

an actuator equipped with a rotatable ring-shaped magnet, a coil, and a stator disposed with respect to the magnet in an axial direction of the magnet, the magnet being movable to one of a first rotational position and a second rotational position due to switching of the direction of energization of the coil; and a member to be moved, which is movable in the axial direction of the magnet from one abut end position to another abut end position as the magnet is moved from one of the first rotational position and the second rotational position to the other of the first rotational position and the second rotational position within a movable range between the first rotational position and the second rotational position, wherein the movable range of the magnet is set in a manner that a torque acting in a rotational direction during cessation of energization of the coil at a time when the magnet is at the first rotational position becomes smaller than a torque required for holding the magnet at the first rotational position, and wherein the member to be moved is held at the one abut end position by a magnetic force acting in the axial direction between the magnet and the stator during cessation of energization of the coil.

* * * * *